Jan. 16, 1951
A. C. PRICHARD
2,538,040
INTERFERENCE REDUCTION CIRCUIT
FOR RADIO PULSE RECEIVERS
Filed May 1, 1943
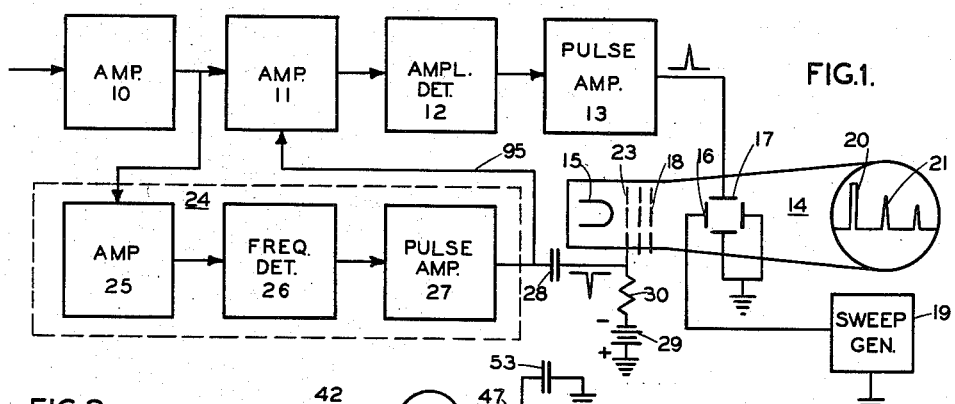
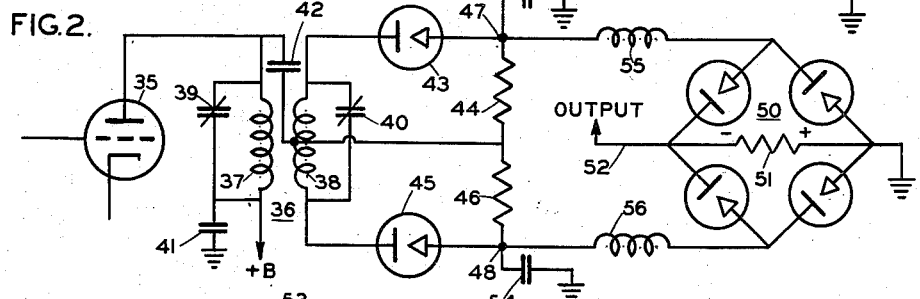
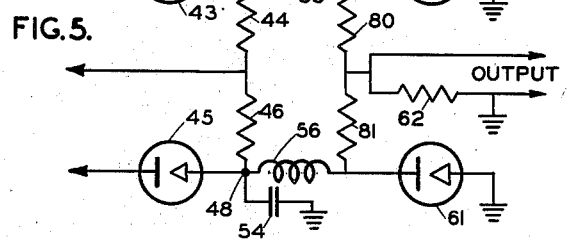
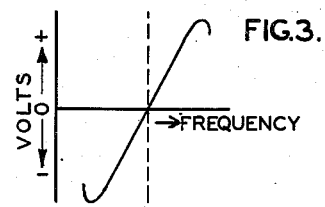
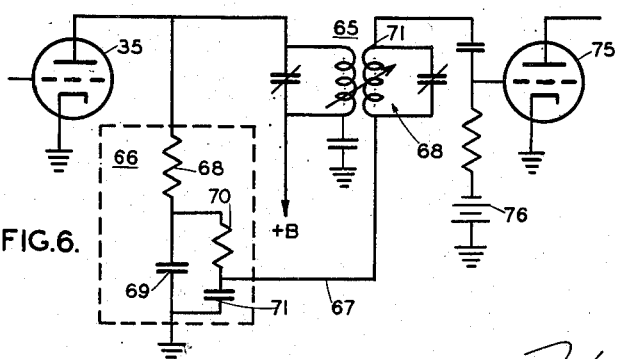
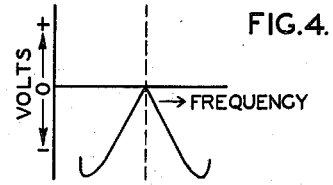
INVENTOR.
ARTHUR C. PRICHARD
BY
William D. Hall.

Patented Jan. 16, 1951

2,538,040

UNITED STATES PATENT OFFICE 2,538,040

INTERFERENCE REDUCTION CIRCUIT FOR RADIO PULSE RECEIVERS

Arthur C. Prichard, Long Branch, N. J., assignor to the United States of America as represented by the Secretary of War Application May 1, 1943, Serial No. 485,371

10 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to interference reduction in signaling equipment, particularly such equipment as is used in pulse-echo systems of object detection; although the invention is equally applicable to communication equipment using similar types of signals.

In conventional pulse-echo object detection systems, pulses of radio frequency energy of fixed frequency are periodically transmitted. On striking a target, reflected pulses are received and the time interval between the transmitted and received pulses is a measure of the distance. For measuring purposes both the transmitted signals and the received echoes are used to vertically deflect the beam of an oscilloscope, the horizontal trace of which is synchronized with the transmitted pulses. The distance between the two deflections on the oscilloscope trace is a measure of the distance to the reflecting object.

In order to obtain accurate definition of the sharp pulses generated in such systems it is necessary to use receivers having wide band channels. This feature causes considerable interference when a plurality of units operating on nearby frequencies, which are within the passband of said channels, are located in the same area. Since such units are not pulsed synchronously, this gives rise to a plurality of pulse images continuously moving on the oscilloscope screen of any one unit, causing considerable difficulty in keeping track of the desired echoes and resulting in quick fatigue of the operating personnel. It also makes possible deliberate jamming by the enemy through the use of frequency modulated or amplitude modulated signals which are within the acceptance band of the receiver channels.

An object of the invention, therefore, is to provide a receiver system which can have wide band channels and still be responsive only to signals of a desired frequency or within a narrow band including said frequency.

Another object of the invention is to devise suitable frequency discriminating circuits for use with such systems.

In accordance with the invention, a frequency responsive detector network is connected at some point in the radio frequency channel of the receiver. This network delivers a minimum output in response to signals at or near the center frequency of said channel, but for signals which are displaced in frequency from the center or mean frequency of said channel, a unidirectional voltage is generated, the magnitude of said voltage being proportional to the amount of said displacement and the polarity of said voltage being the same whether said displacement is above or below said mean frequency. This voltage is, if necessary, amplified and then applied as a negative bias to the receiver channels or to the intensity grid of the oscilloscope or both. If said displacement is more than a predetermined amount, the negative bias will be sufficient to greatly reduce or block either the receiver channel output or the oscilloscope beam or both. As a result, off-frequency signals will not appear at all on the oscilloscope, or will at least be greatly reduced in intensity so that they manifest themselves as mere shadows moving across the screen.

For a better understanding of the invention, together with other and further objects thereof, reference is had to the following description taken in connection with the accompanying drawings, wherein like parts are indicated by like reference numerals, and its scope will be pointed out in the accompanying claims.

In the accompanying drawings:

Figure 1 is a block diagram, partly schematic, of a complete receiver incorporating the invention;

Figure 2 is a circuit diagram of one form of frequency responsive detector network which may be used in the circuit in Figure 1;

Figures 3 and 4 are graphs illustrating the operation of the circuit in Figure 2; and Figures 5 and 6 are circuit diagrams of alternative forms of the frequency responsive detector network.

Referring now more particularly to Figure 1, there is shown a circuit of a receiver having radio frequency amplifiers 10 and 11 tuned to the frequency of the signals, a detector 12, pulse amplifier 13, and signal reproducer 14.

The reproducer 14 is, in this case, a conventional cathode ray oscilloscope having the usual elements, such as cathode 15, intensity control grid 23, a pair of horizontally deflecting electrodes 16, and a pair of vertically deflecting electrodes 17. It may have additional control grids 18 as well as the usual focusing electrodes and circuits therefor (not shown). The output of a saw tooth sweep voltage generator 19 is applied to one pair of deflecting electrodes, in this case horizontally deflecting electrodes 16. The signal output of the receiver is applied to the other pair of deflecting electrodes 17.

As thus far described the receiver system is one commonly used in object detection systems above referred to. In a manner well known, each cycle of saw tooth voltage of generator 19 is initiated synchronously with the transmission of a pulse of ultra high frequency energy from a transmitter (not shown). The transmitted pulse is impressed on the receiver and applied to deflecting electrodes 17, which vertically deflect the horizontal trace of the oscilloscope produced by the saw tooth voltage, as indicated at 20. The reflected signals will appear laterally displaced on the trace of the oscilloscope, as indicated at 21. The distance between the main signal trace 20 and the echo trace 21 is a measure of the distance to the reflecting object. For more detailed showings of such systems, reference is made to U. S. Patents 2,143,035 and 2,227,598.

For reasons above referred to, the R. F. channels 10 and 11 of the receiver must have a wide pass-band for transmission of sharp pulses without distortion. As a result, signals from nearby transmitters operating at any frequency within the pass-band of channels 10 and 11 cause considerable interference. By means of the auxiliary circuits hereinafter described, which constitute the subject matter of this invention, the effects of this type of interference are considerably reduced or entirely eliminated.

The auxiliary circuits referred to are included in a channel 24 connected at any point in the R. F. channel of the receiver. In this case it is connected to the output of amplifier 10, although channel 24 may be connected at any point between the receiver input and detector 12. In this channel, a voltage is generated in response to interfering signals, particularly signals which are of frequencies other than the frequency of the desired signals. Said voltage is then applied to an amplitude control element of the main receiver channel, or the reproducer, in this case a beam controlling element of the oscilloscope, in such direction as to reduce or entirely suppress the response of said receiver channel or oscilloscope.

Channel 24 includes a buffer amplifier 25, which is tuned to the mean or center frequency of the receiver channel. This amplifier may be omitted if the effect of the additional load due to auxiliary circuits is not important.

Amplifier 25 feeds into a frequency responsive detector network 26, hereinafter described in detail. The ideal characteristics of this network are illustrated by the graph in Fig. 4, which shows the output voltage of the said network with respect to the frequency of the currents applied thereto. It will be seen from this curve that the output voltage is zero or minimum at the frequency indicated by the dotted line, which may be considered the mean or center frequency. At frequencies displaced on either side of this frequency, within limits determined by the design of said network, an output voltage is developed, the magnitude of which is substantially proportional to the extent of displacement of said frequencies from the mean frequency. Beyond said limits, the output voltage again decays to zero. Said limits may be chosen so that the output voltage is maximum at the limits of the pass-band of the R. F. channels.

The output of network 26 is, if necessary, amplified by a pulse amplifier 27 and applied through a blocking condenser 28, of low impedance to the pulse energy, to the first intensity grid 23 of the oscilloscope. This grid is biased negatively by a voltage from source 29 applied through a high resistance 30, the magnitude of this bias being normally insufficient to cut off the beam. The output of amplifier 27 is applied to grid 23 in such direction that the negative bias is increased with resultant reduction in intensity or entire suppression of the beam. The beam suppression voltage should be of such magnitude and duration that the beam is cut off just before the deflecting voltage applied to plates 17 is developed, and remains cut off for the entire duration of said deflecting voltage.

The output of amplifier 27 can also be applied over lead 95 to a grid of a tube in amplifier 11 in such direction as to drive said tube to cut-off and thus prevent signals from being reproduced. Either or both of the above described signal suppressing methods can be used, but it is sufficient to merely cut off the oscilloscope beam.

The tuned components of channel 24 can be more sharply tuned than those of the main receiver circuits since pulse distortion in this channel is not important.

Thus the auxiliary channel functions in such manner that no signal reproduction will result upon the occurrence of any interfering signal within the pass-band of the receiver channels providing the frequency of said signal is displaced more than a predetermined amount from the desired signal frequency. Since most interference of this type is pulse modulated, the desired pulse signals will still be reproduced unless the interfering pulses are exactly synchronized with the desired pulses; an occurrence which is extremely unlikely if not impossible. Even if this should occur, it is a simple matter to shift the phase or repetition rate of the desired pulses.

Of the components of auxiliary channel 24, amplifiers 25 and 27 are conventional and similar in design to components 10 and 13. The frequency responsive detector network 26 is, however, a modified network of the type commonly used for detection of frequency modulated waves or for automatic frequency control. Several such networks suitable for use with this invention will now be described.

Referring more particularly to Fig. 2, tube 35, in the output stage of amplifier 25, is connected to a transformer 36, the primary 37 and secondary 38 being loosely coupled and sharply tuned to the center frequency of amplifiers 10 and 25 by means of condensers 39 and 40 respectively. Condenser 41 bypasses the B voltage source, connected to tube 35, for radio frequency currents. A connection is made from the high potential side of coil 37 to the electrical center point of coil 38 through a blocking condenser 42, of low impedance to the R. F. currents. Like diodes 43 and 45 are connected in series with like load resistors 44 and 46 between opposite ends of coil 38 and said center point of the coil. The direction of currents through resistors 44 and 46 are such that their outputs are in opposition.

As thus far described, this circuit operates as follows:

Rectifiers 43 and 45 are energized by the voltage across secondary coil 38 in phase opposition. They are also energized in like phase by the primary voltage through blocking condenser 42. At resonance, the secondary voltage is phase displaced 90° with respect to the primary voltage. As a result, the vector sum of the primary and secondary voltages on diodes 43 and 45 are equal and the resultant rectified voltages across load resistors 44 and 46 are equal. Since said voltages are in opposition, the net voltage between points 47 and 48 is zero.

On each side of the resonant or center frequency of the transformer, the phase relation between the primary and secondary voltages changes. Hence if currents of a frequency above said center frequency are applied, the vector sum of the voltages on one of diodes 43 and 45 increases while it decreases on the other diode. If the currents are below the center frequency, the vector sum of the voltages on the respective diodes vary in an opposite manner. For a more detailed description of the operation of this portion of the circuit, reference is made to standard reference books such as "Frequency Modulation" by August Hund, page 195 et seq. as well as the bibliography cited therein.

The variation in output voltage across points 47 and 48 is ideally shown in Fig. 3. At the desired intermediate frequency indicated by the dotted line, the voltage is zero. At frequencies displaced on either side of said intermediate frequency the output voltage is, over a predetermined range, substantially proportional to the extent of such displacement. Said predetermined range depends on the sharpness of tuning of at least the secondary of transformer 36. Beyond said range the voltage again decreases.

The form of voltage change shown in Fig. 3 is not ideally suited for use as a beam suppressing voltage, since the polarity of the output voltage changes with the direction of displacement of the applied signal from the center frequency. Since it is desired to obtain a voltage which is always of the same polarity regardless of the direction of said displacement, such as shown in Fig. 4, it is necessary to full wave rectify the output voltage across points 47 and 48. For this purpose said voltage is applied to the input leads of a conventional bridge rectifier 50, the desired voltage of constant polarity being derived across load resistor 51. Said voltage is then applied through lead 52 to amplifier 27 (Fig. 1) and then in negative direction to grid 23 of oscilloscope 14.

In order to get a sharp null voltage at the center frequency it is necessary to keep all R. F. currents out of the bridge rectifier. For this purpose R. F. bypass condensers 53 and 54 are used, which have low impedance to radio frequency currents, but high impedance to the detected components; in this case the pulse components. Additional filter chokes 55 and 56 are connected in series with the bridge rectifier, said chokes having high impedance to radio frequency currents, but low impedance to the pulse components. The time constant of the output circuit including resistors 44 and 46, condensers 53 and 54, and chokes 55 and 56 should be short enough to follow the pulse envelope. For most effective operation, the time constant of the circuit should be such that the duration of the beam suppressing voltage is at least as long, and preferably slightly longer, than the duration of the pulse output of the receiver. The magnitude of said suppressing voltage and its rate of rise should be sufficient to reduce or suppress the oscilloscope beam before sufficient beam deflecting voltage at deflecting plates 17 is developed.

The circuit in Fig. 2 can be simplified in a manner shown in Fig. 5. By splitting the filtered voltage from points 47 and 48 into two out of phase potentials by means of two equal resistors 80 and 81, only two additional diodes 60 and 61 need be used for full wave rectification. The output appears across load resistor 62 common to both diodes. This form of network requires higher R. F. inputs than the form in Fig. 2.

A third form of frequency responsive detector network is shown in Fig. 6. The output circuit of amplifier tube 35 is connected to a transformer having its primary and secondary coils loosely coupled and sharply tuned to the R. F. center frequency. A 90° phase shifting circuit 66 is connected in parallel with the primary coil. The output of this phase shifter, between lead 67 and ground, is connected in series with the secondary circuit 68 of transformer 65. The coupling between the primary and secondary coils of transformer 65 is made adjustable so that the amount of energy transfer can be varied.

Phase shifter 66 is so constructed that the phase shift at the center frequency is substantially 90° for an appreciable band of frequencies on either side of the center frequency. For this purpose the resistor 68 has a resistance which is high with respect to the reactance of capacitor 69. Since said reactance is only a small part of the impedance of the circuit including resistor 68 and capacitor 69 in series, the voltage across capacitor 69 lags substantially 90° with respect to the voltage across said series circuit. Since said lag can never be exactly 90°, an additional amount of phase shift can, if necessary or desirable, be introduced by means of an additional resistor 70 and capacitor 71 connected in series across capacitor 69. By proper choice of component values the phase lag across capacitor 71 can be made exactly 90° with respect to the voltage across the input of the phase shifter.

Referring now to the operation of the circuit in Fig. 6, the transformer is sharply resonant to the center frequency of the receiver channel. Therefore at resonance the voltage across the secondary is 90° with respect to the primary. The secondary voltage is, however, opposed to the voltage across capacitor 71, which is also displaced 90° with respect to the voltage across the primary but in the opposite direction with respect to the secondary voltage. By varying the coupling between the primary and secondary or suitably amplifying the output of phase shifter 66, the two phase displaced voltages can be equalized and, since they are in opposition, the net voltage between point 71 and ground is zero or minimum at resonance. For currents having frequencies on either side of resonance, the phase shift of the secondary voltage is no longer 90° with respect to the primary voltage while the phase shift of the voltage in the output of phase shifter 66 remains substantially constant. As a result, the two voltages are no longer in exact phase opposition and a resultant voltage appears between point 71 and ground, the magnitude of said resultant voltage being proportional to the displacement of the applied frequency from the center frequency of transformer 65, within limits depending on the bandpass of said transformer. The resultant voltage can be amplified, if necessary, and then rectified in tube 75. The grid of said tube should preferably be biased sufficiently negative, by means of battery 76, so that no grid current will be drawn.

The rectified resultant voltage has a characteristic similar to that shown in Fig. 4 and is therefore suitable for use as a beam suppressing voltage in the manner shown in Fig. 1. The above mentioned design of phase shifter 66 can be altered to yield a greater output. Thus the reactance of capacitor 69 can be made equal to the resistance 68, so that the resultant phase shift across the capacitor will be 45°. The additional 45° phase shift is then obtained by means of resistor 70 and capacitor 71. This type of construction will yield a greater output across the condenser, but will result in a network which does not give as symmetrical a response on both sides of the center frequency as can be obtained with the design previously described. However it should be understood that the invention is not limited for use with the phase shifter described, since other conventional phase shifters can be used so long as the phase of the voltage in the output of such phase shifter is opposed to the phase of the voltage across the secondary at the center frequency and so long as the rate of change of phase of said voltages with respect to change in applied frequency is unequal. Preferably the change in phase with respect to frequency of one voltage should be opposite to that of the other voltage.

The circuit in Fig. 6 is essentially a filter having maximum attenuation in the vicinity of a given frequency and rapidly diminishing attenuation at frequencies on either side of said given frequency. It can therefore be generally used as a rejection filter for any desired frequency or band of frequencies. It has an additional advantage in that it can be connected to negatively biased amplifying circuits which dissipate a minimum of power.

Several circuits have been described which can be used as the frequency responsive network 26 in auxiliary channel 24. It should be understood, however, that there are numerous equivalents thereof which are equally applicable.

The receiver channels above described can be tuned directly to the received signal, as is the practice in straight tuned radio frequency receivers, or they can constitute the intermediate frequency channel of a conventional superheterodyne receiver having the usual signal frequency amplifier and frequency changer. In such case, detector 12 would constitute the second detector or demodulator of the receiver.

The above described interference reducing methods and circuits are also applicable to signalling systems using other than radio frequency currents. For instance they are equally applicable to submarine object detectors or depth sounding equipment using acoustic waves of either sonic or supersonic frequencies.

While there have been described what are at present considered preferred embodiments of the invention, it will be obvious to those skilled in the art that various changes and modifications may be made therein without departing from the invention, and it is, therefore, aimed in the appended claims, to cover all such changes and modifications as fall within the true spirit and scope of the invention.

I claim:

1. A superheterodyne receiver system for pulse modulated interrupted continuous waves comprising a first tuned intermediate frequency channel including a plurality of amplifiers and having a predetermined center frequency and a relatively wide band pass, an amplitude modulation detector for said waves connected to the output of said amplifier, a cathode ray tube having beam deflection control means controlled by the output of said detector, a beam-intensity control electrode in said tube biased to permit said beam to illuminate said tube screen where it impinges, a second channel electrically coupled to said intermediate frequency channel to derive an output therefrom, said second channel being sharply tuned to said center frequency for reception thereof and comprising a frequency responsive detector circuit substantially unresponsive to the amplitude of said waves, the output voltage of said detector circuit, in response to current pulses applied thereto, having substantially the same time coincidence and varying as a function of the displacement in frequency of said current pulses from said center frequency, and means responsive to said output voltage and coupled to said electrode to vary the beam intensity of said cathode ray tube.

2. A superheterodyne receiver system for pulse modulated continuous waves comprising a tuned intermediate frequency channel including a plurality of amplifiers and having a predetermined mean frequency and a relatively wide band pass, an amplitude modulation detector for said waves connected to the output of said channel, a video amplifier connected to said detector, a cathode ray tube having an intensity control grid and beam deflecting means, said deflecting means being connected to the output of said video amplifier, a second channel electrically coupled to a point in said intermediate frequency channel to derive an output therefrom, said second channel being sharply tuned to said mean frequency for reception thereof and comprising a frequency discriminator circuit, the output voltage of which is proportional to the displacement in frequency of the applied current pulse from said mean frequency and substantially coincides in time with said applied current pulse, means for rendering the polarity of each output voltage pulse of said discriminator independent of the direction of said displacement, and means to amplify and impress said output voltage on said intensity grid in such direction as to decrease the beam intensity of said cathode ray tube.

3. A frequency discriminating circuit comprising a transformer including a primary coil, a secondary circuit including a coil and a condenser connected in parallel and sharply tuned to a predetermined frequency, a substantially 90° phase shifting circuit having its input circuit connected in parallel with the primary circuit and its output circuit connected in series with the secondary circuit, the output voltage of said phase shifter being in phase opposition to the output of said secondary circuit.

4. A circuit as set forth in claim 3, including in combination therewith a rectifier energized by the output of said series connected elements.

5. A circuit as set forth in claim 3, including in combination therewith a negatively biased electron tube circuit connected across said series connected elements.

6. A frequency discriminating circuit comprising a sharply tuned transformer including primary and secondary coils, means to resonate each of said coils to a predetermined frequency to form parallel resonant primary and secondary circuits, and a substantially 90° phase shifting circuit having its input circuit connected in parallel with the primary circuit and its output circuit connected in series with the secondary circuit, the output voltage of said phase shifter being in phase opposition to the output of said secondary circuit.

7. A frequency discriminating circuit comprising a sharply tuned transformer including primary and secondary coils, means to resonate each of said coils to a predetermined frequency to form parallel resonant primary and secondary circuits, and a phase shifting circuit having its input circuit connected in parallel with the primary circuit and its output circuit connected in series with the secondary circuit, the output voltage of said phase shifter being in phase opposition to the voltage across said coil, said phase shifter having such characteristics that an entire band of frequencies in the vicinity of said predetermined frequency are phase shifted in the vicinity of 90°.

8. A circuit as set forth in claim 7, wherein said phase shifting circuit comprises a resistor connected to the high potential side of said primary coil, the other side of said resistor being connected to one terminal of a reactor, the other side of which is grounded, the reactance of said reactor at said frequency being a small fraction of the resistance of said resistor, a second resistor and reactor connected in series across said first mentioned reactor, the low potential side of said secondary coil being connected to the junction of said second resistor and reactor, the output terminals of said circuit being the high potential terminal of said secondary coil and ground.

9. A circuit as set forth in claim 7, wherein said phase shifting circuit comprises a resistor and capacitor connected in series, the reactance of said capacitor at said frequency being a small fraction of the resistance of said resistor, a second resistor and condenser connected in series across said first mentioned condenser, one terminal of said secondary coil being connected to the junction of said second resistor and condenser, an output terminal of said circuit being the other terminal of said secondary coil.

10. A circuit as set forth in claim 7, wherein said phase shifting circuit comprises a resistor connected to the high potential side of said primary coil, the other side of said resistor being connected to one terminal of a capacitor, the other side of which is grounded, the reactance of said capacitor at said frequency being a small fraction of the resistance of said resistor, a second resistor and capacitor connected in series across said first mentioned capacitor, the low potential side of said secondary coil being connected to the junction of said second resistor and capacitor, the output terminals of said circuit being the high potential terminal of said secondary coil and ground.

ARTHUR C. PRICHARD.

REFERENCES CITED

The following references are of record in the file of this patent:

UNITED STATES PATENTS

| Number | Name | Date |
|---|---|---|
| 2,021,939 | Koch | Nov. 26, 1935 |
| 2,056,607 | Holmes | Oct. 6, 1936 |
| 2,070,354 | Brand | Feb. 9, 1937 |
| 2,083,243 | Schade et al. | June 8, 1937 |
| 2,095,314 | Conklin | Oct. 12, 1937 |
| 2,096,874 | Beers | Oct. 26, 1937 |
| 2,143,035 | Smith | Jan. 10, 1939 |
| 2,152,515 | Wheeler | Mar. 28, 1939 |
| 2,168,874 | Lewis et al. | Aug. 8, 1939 |
| 2,173,173 | Lewis | Sept. 19, 1939 |
| 2,227,598 | Lyman et al. | Jan. 7, 1941 |
| 2,237,457 | Tellegen | Apr. 8, 1941 |
| 2,241,256 | Gould | May 6, 1941 |
| 2,264,019 | Case | Nov. 25, 1941 |
| 2,265,744 | Rath | Dec. 9, 1941 |
| 2,276,672 | Roberts | Mar. 17, 1942 |
| 2,287,296 | Dallos | June 23, 1942 |
| 2,301,649 | Thompson | Nov. 10, 1942 |
| 2,342,708 | Usselman | Feb. 29, 1944 |
| 2,371,397 | Koch | Mar. 13, 1945 |
| 2,405,238 | Seeley | Aug. 6, 1946 |
| 2,470,464 | Bowie | May 17, 1949 |
| 2,489,254 | Arnold | Nov. 29, 1949 |

FOREIGN PATENTS

| Number | Country | Date |
|---|---|---|
| 446,663 | Great Britain | May 4, 1936 |
| 112,309 | Australia | Jan. 23, 1941 |

OTHER REFERENCES

Everitt, Communications Engineering, second edition, 1937, pages 433 to 436.